United States Patent Office 3,303,191
Patented Feb. 7, 1967

3,303,191
NOVEL 4-KETODIHYDRO-2,1-BENZOTHIAZINE-2,2-DIOXIDES
Bernard Loev, Broomall, Pa., assignor to Smith Kline & French Laboratories, Philadelphia, Pa., a corporation of Pennsylvania
No Drawing. Filed Mar. 11, 1965, Ser. No. 439,101
9 Claims. (Cl. 260—243)

This invention relates to a novel series of new organic compounds characterized by having a 4-ketodihydrosulfostyril nucleus. These new compounds have utility as intermediates for preparing corresponding sulfostyrils which are important new biologically active compounds. The sulfostyril end products have hypoglycemic, central nervous system depressant, antipyretic, antiviral and especially hypotensive activity. Certain of these new 4-ketodihydrosulfostyrils also have similar biological activities especially hypotensive activity as will be apparent hereafter.

The nucleaus of the new compounds of this invention is designated by Chemical Abstracts terminology as 2,1-benzothiazine-2,2-dioxide. The coined name for this structure used in the description and examples herein is "sulfostyril" which name is used for sake of simplicity. See B. Loev and M. F. Kormendy, Journal of Organic Chemistry, 30, 3163 (1965) and copending Serial No. 439,099, filed March 11, 1965.

This invention also relates to processes for making and using these new compounds.

These new compounds are illustrated by the following structural formula:

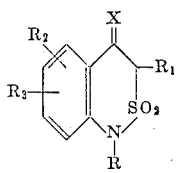

in which:
R is hydrogen, lower alkyl, phenyl, lower alkanoyl or dialkylaminoalkyl;
$R_1$ is hydrogen, lower alkyl or phenyl;
$R_2$ and $R_3$ are inert radicals such as hydrogen, halo such as fluoro, bromo or chloro, trifluoromethyl, lower alkyl, amino, hydroxy, lower alkoxy or lower alkylthio; and
X is oxygen, sulfur and functional derivaties thereof.

Also included in this reaction are alkali metal salts such as the sodium and potassium salts as well as the important keto functional derivatives such as the oxime thiosemicarbazone or hydrazones. The latter compounds are especially important aspects of this invention since they have appreciable hypotensive and antidiabetic activity.

The 4-ketodihydrosulfostyrils of this invention are prepared from readily available starting materials as follows:

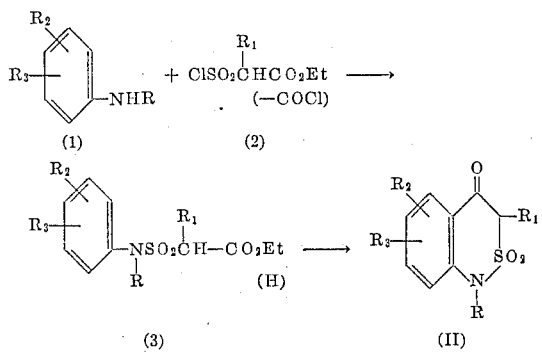

in which $R_1$–$R_3$ are as above defined and R is hydrogen, diloweralkylaminoalkyl, lower alkyl or phenyl.

A substituted aniline (1) is condensed with a lower alkyl chlorosulfonylacetate (2) to give a lower alkyl N-phenylsulfamylacetate (3). The acid of (3) is cyclized in an excess of polyphosphoric or sulfuric acid with heating at about 100–150° C. or trifluoroacetic anhydride at 0 to 100° C. to give the desired 4-keto-3,4-dihydrosulfostyril (II).

It will be appreciated that the 4-ketodihydrosulfostyrils of this invention can form the usual keto and sultam derivatives. The 4-keto group can be converted into its standard functional derivatives such as the oxime with hydroxylamine or various hydrazones such as the phenyl hydrazones, dinitrophenylhydrazones, p-toluenesulfonylhydrazones, phenylsulfonylhydrazones all prepared using standard methods. The latter compounds have biological utility especially hypotensive activity but even more importantly these compounds have unexpectedly been found to decompose in the presence of an alkali metal lower alkoxide or hydroxide in a suitable solvent such as methanol, ethanol, ethylene glycol, or other like solvents to form the desired sulfostyrils which are claimed in a copending application.

Other derivatives are also easily prepared and are a part of this invention for example the 4-keto group enolizes very readily to form 4-O-acyl or 4-O-lower alkylsulfostyril derivatives. Also the nitrogen atom of the sultam moiety is readily substituted by standard alkylation or acylation methods. Alternately, N-substituted products are available by starting out with the appropriately substituted anilines. The acyl reactions are best illustrated by forming lower alkanoyl derivatives, the alkylation reactions by alkylation or phenylation reactions as described in copending application Serial No. 439,098, filed March 11, 1965.

Additionally, the 4-ketodihydrosulfostyrils described above can be nuclear halogenated in the benzo ring using N-haloamides preferably N-halosuccinimides to form the 6-halo derivatives as described in said copending application.

These compounds (II) also form nontoxic salts with alkali metals especially sodium and potassium salts which are equally a part of this invention.

Other variations of this invention will be apparent to those skilled in the art for example the O or N acetyl derivatives are considered equivalent with other O or N acyl compounds, the phenyl compounds such as at the N or hydrazone portions of the compounds can be substituted phenyl or thienyl, the lower alkyl can be substituted alkyl, other variations of the processes can be used such as using other cyclization agents such as sulfuric or perchloric acids, trifluoroacetic anhydride, aluminum chloride, etc. Such variations have not been found to be advantageous over the nub of the invention described herein.

The term "lower" in connection with a hydrocarbon chain containing moiety such as alkyl, alkoxide, acylate etc. is best illustrated as having from 1–8 carbon atoms preferably 1–2 carbon atoms in the carbon chain portion of the hydrocarbon portion of the radical.

The following examples are designed to illustrate this reaction in order to make its practice apparent to those skilled in this art.

*Example 1*

A concentrated solution of 40.0 g. (0.232 mole) of methyl chlorosulfonylacetate in ether is added to a solution of 45.3 g. of aniline in 500 ml. of ether at 10° C. After stirring at room temperature for an hour, the molten filtrate is concentrated to give methyl N-phenylsulfamylacetate, M.P. 79.5–80° C. from isopropyl ether.

The ester (20 g.) is hydrolyzed in 77 ml. of 10% sodium hydroxide solution by heating at reflux for 3 hours. Cooling, acidifying and extraction with chloroform gives the acid, M.P. 118.5–119° C. or 166–167° C. (polymorphic forms).

A mixture of the acid (10 g.) and polyphosphoric acid (200 g.) is heated to 125° C. and maintained at that temperature for 5 minutes with stirring. The cooled mixture is quenched in ice-water to separate the desired 4-keto-3,4-dihydrosulfostyril, M.P. 192–193° C. from ether. It dissolves in sodium bicarbonate solution from which the sodium salt can be isolated.

Example 2

A mixture of 50 g. (0.254 mole) of 4-ketodihydrosulfostyril, 52 g. of p-toluenesulfonylhydrazine, 500 ml. of ethanol and 0.5 ml. of concentrated hydrochloric acid is heated at reflux for 3 hours. The mixture is concentrated to 200 ml. then quenched to give the p-toluenesulfonylhydrazone of 4-ketodihydrosulfostyril, M.P. 213–214° C. from alcohol-water.

This compound has hypotensive activity.

Similarly the 2,4 - dinitrophenylhydrazine, M.P. 276–277° C. and phenylhydrazone, M.P. 241–244° C. are prepared.

Example 3

The hydrazone from Example 2 (85 g.) is dissolved in 1.7 l. of hot ethanol then 39.4 g. (0.703 mole) of sodium methoxide is added. Water is added to dissolve the separated solid and the mixture is heated at reflux for 18 hours. The solution is concentrated to a small volume, diluted with water and made acid to separate a solid which is extracted with boiling water. Cooling separates sulfostyril, M.P. 153–155° C. from chloroform.

Example 4

A mixture of 5 g. (0.0237 mole) of 4-ketodihydrosulfostyril and 4.2 g. of N-bromosuccinimide are ground and mixed in a mortar then dissolved in dimethylformamide. The solution is heated on the steam bath for ½ hour then concentrated. The resulting gum is triturated with water to give a green solid. After chromatography over a neutral alumina column using benzene as eluent, 6-bromo-4-keto-3,4-dihydrosulfostyril, M.P. 157–163° C. from cyclohexane, is obtained.

Example 5

A solution of 20 g. of 4-ketodihydrosulfostyril in 10% sodium hydroxide solution is mixed with 35 ml. of dimethylsulfate then warmed to 45° C. The pH is maintained at 7–8 with sodium hydroxide. When the mixture remains basic the aqueous layer is decanted and the insoluble oil crystallizes to give 4-methoxy-N-methylsulfostyril, M.P. 153–155° C., the methyl enolate derivative of N-methyl-4-ketodihydrosulfostyril.

Example 6

A solution of 20 g. of 4-ketodihydrosulfostyril in 10% sodium hydroxide solution is reacted with 35 ml. of dimethyl sulfate at 45° C. The pH is maintained at 7–8 as in Example 5. The aqueous layer is then decanted and made acid. The solid is chromatographed over neutral alumina using benzene to give N-methyl-4-keto-dihydrosulfostyril, M.P. 120–122° C.

Example 7

A mixture of 5 g. of N-methyl-4-ketodihydrosulfostyril and 4.2 g. of N-bromosuccinimide in 15 ml. of dimethyl formamide is heated on the steam bath for ½ hour. The solvent is removed. The resulting oil is solidified by trituration with water then is chromatographed over neutral alumina using benzene to give 6-bromo-1-methyl-4-ketodihydrosulfostyril, M.P. 155–161° C.

Example 8

A solution of 59 g. (0.33 mole) of chlorosulfonylacetyl chloride in dry benzene is added dropwise to 143 g. (0.33 mole) of N-methylaniline in dry benzene. After 18 hours, the salt is filtered off and the solvent removed. The residual oil crystallizes and is N,N'-diphenylsulfamylacetamide, M.P. 79–81° C.

The amide is dissolved in alcoholic potassium hydroxide and kept at room temperature for 3 days. The filtrate is evaporated. The residue is stirred under dilute hydrochloric acid. The separated oil is extracted with methylene chloride. Concentration gives N-phenylsulfamylacetic acid, M.P. 120–122° C. This acid is cyclized as described or with polyphosphoric acid at 130–150° C. to give N-methyl-4-ketodihydrosulfostyril.

Example 9

A mixture of 5 g. of 4-ketodihydrosulfostyril, 7.8 g. of acetic anhydride, 20.5 g. of triethylamine in 100 ml. of tetrahydrofuran is heated at reflux for 3 hours. The solvent is removed and the residue stirred with water to give N-acetyl-4-ketodihydrosulfostyril, M.P. 198–200° C.

Example 10

A mixture of 3 g. of N-methyl-4-ketodihydrosulfostyril and 3.15 g. of phosphorus pentasulfide in 100 ml. of dioxane is refluxed for one hour and poured onto ice. The product is separated and recrystallized from alcohol-water to give N-methyl-4-thio-dihydrosulfostyril.

Example 11

Diphenylamine is converted to its sulfonamide by reaction with ethyl chlorosulfonylacetate in triethylamine. The carbomethoxymethylsulfonamide is hydrolyzed and cyclized as described in Example 1 to give N-phenyl-4-ketodihydrosulfostyril.

Example 12

A mixture of 50 g. of p-trifluoromethylaniline in ether with 40 g. of ethyl chlorosulfonylacetate is reacted as in Example 1 to give methyl N-p-trifluoromethylphenylsulfamylacetate, M.P. 134.5–135° C. The acid is formed and is cyclized by refluxing with trifluoroacetic anhydride in benzene for 45 minutes, then concentrated to give 6-trifluoromethyl-4-keto-3,4-dihydrosulfostyril. This compound (2 g.) is reacted with tosylhydrazine as described above to give the hydrazone which is then converted to 6-trifluoromethylsulfostyril as described in Example 3.

Example 13

A mixture of 25 g. of o-anisidine is reacted with 22 g. of methyl chlorosulfonylacetate as in Example 1 to give the sulfamyl ester then the acid. N-o-methoxyphenylsulfamylacetic acid (5 g.) is heated to 150° C. with an excess of polyphosphoric acid to give 8-methoxy-4-keto-3,4-dihydrosulfostyril. This compound is converted to the tosylhydrazone and to 8-methoxysulfostyril as described.

Example 14

A mixture of 15 g. of p-toluidine is reacted with 14 g. of methyl 2-chlorosulfonylpropionate as described above to give the ester then the acid which (2.5 g.) is heated at 135° C. in an excess of polyphosphoric acid to give 3,6-dimethyl-4-keto-3,4-dihydrosulfostyril. This compound is in turn converted into 3,6-dimethylsulfostyril via decomposition of the hydrazone derivative as described.

Example 15

A mixture of 10 g. of 2-chloro-o-anisidine is reacted with an excess of methyl chlorosulfonylacetate to form methyl N - (2 - chloro-5-methylphenyl)sulfamylacetate which is hydrolyzed in the acid in the usual way. The acid (6 g.) is heated at 135° C. in an excess of polyphosphoric acid to give 5-methyl-8-chloro-4-keto-3,4-dihydrosulfostyril. Conversion to the hydrazone the alkaline degradation gives the 5-methyl-8-chlorosulfostyril.

*Example 16*

A mixture of 5 g. of 4-ketodihydrosulfostyril, 7.8 g. of acetic anhydride and 20.5 g. of triethylamine in 100 ml. of tetrahydrofuran is refluxed for 3 hours. Concentration in vacuo leaves a red oil which is triturated with water. The aqueous solution is acidified with hydrochloric acid to give N-acetyl-4-hydroxysulfostyril, M.P. 198–200° C. From the filtrate is obtained another solid, M.P. 136–138° C., 4-acetoxy-N-acetylsulfostyril.

*Example 17*

Substituting a molar equivalent of N-dimethylaminoethylaniline for aniline in Example 1 gives N-dimethylaminoethyl-4-keto-3,4-dihydrosulfostyril. Other tertiary end groups can also be used as desired such as diethylamino, N,N-methylpiperazinyl, pyrrolidinyl, piperidinyl or morpholinyl.

This compound is converted into the N-dimethylaminoethylsulfostyril as disclosed in Examples 2 and 3 via the tosylhydrazone and its decomposition under alkaline conditions.

What is claimed is:
1. A compound of the structure:

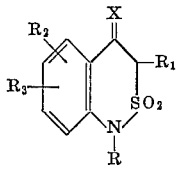

in which:

R is a member selected from the group consisting of hydrogen, lower alkyl, phenyl, diloweralkylaminoalkyl and lower alkanoyl;

$R_1$ is a member selected from the group consisting of hydrogen, lower alkyl and phenyl;

$R_2$ and $R_3$ are members selected from the group consisting of hydrogen, halo, trifluoromethyl, amino, hydroxy, lower alkyl, lower alkylthio and lower alkoxy; and X is a member selected from the group consisting of oxygen, sulfur, phenylhydrazono and tosylhydrazono.

2. 4-keto-3,4-dihydro-2,1-benzothiazine-2,2-dioxide.

3. The p-toluenesulfonylhydrazone of 4-keto-3,4-dihydro-2,1-benzothiazine-2,2-dioxide.

4. 6 - bromo-4-keto-3,4-dihydro-2,1-benzothiazine-2,2-dioxide.

5. N-methyl-4-methoxy-2,1-benzothiazine-2,2-dioxide.

6. 6 - trifluoromethyl-4-keto-3,4-dihydro-2,1-benzothiazine-2,2-dioxide.

7. The method of preparing a compound of the structure:

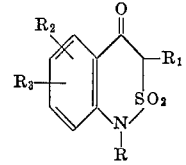

in which:

R is a member selected from the group consisting of hydrogen, lower alkyl, phenyl, and diloweralkylaminoalkyl;

$R_1$ is a member selected from the group consisting of hydrogen, lower alkyl and phenyl; and $R_2$ and $R_3$ are members selected from the group consisting of hydrogen, halo, trifluoromethyl, lower alkyl, lower alkylthio and lower alkoxy;

comprising reacting at from about 100–150° C. in an excess of polyphosphoric acid a compound of the structure:

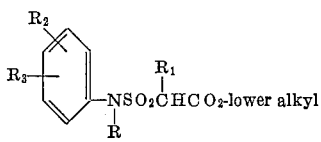

in which R–$R_3$ are as defined hereabove.

8. The method of claim 7 characterized in that R, $R_1$, $R_2$ and $R_3$ are hydrogen and lower alkyl is methyl.

9. The method of claim 7 characterized in that R, $R_1$, $R_2$ and $R_3$ are hydrogen and lower alkyl is ethyl.

References Cited by the Examiner

Chemical Abstracts, Subject Index (January–June 1960), volume 54, page 244s.

Chemical Abstracts, Subject Index (January–June 1962), vol. 56, page 326s.

WALTER A. MODANCE, *Primary Examiner.*

JOHN M. FORD, *Assistant Examiner.*